Nov. 3, 1936.　　　F. G. HOLLAND ET AL　　　2,059,351
BARREL WASHING APPARATUS
Filed Jan. 15, 1934　　　5 Sheets-Sheet 2
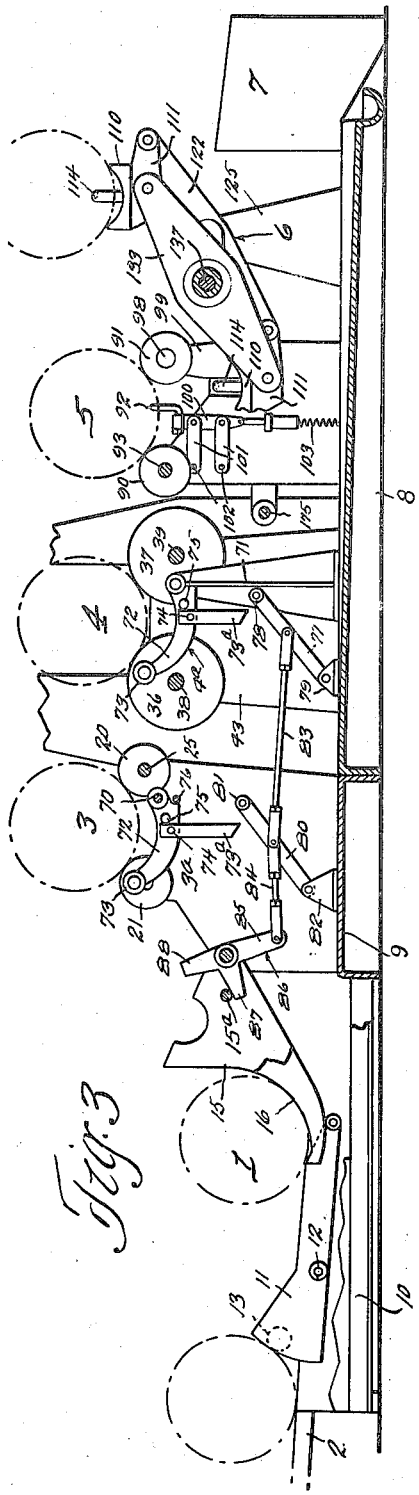
INVENTOR.
Frank G. Holland &
BY John Green
Hull, Brock & Ebest
ATTORNEY.

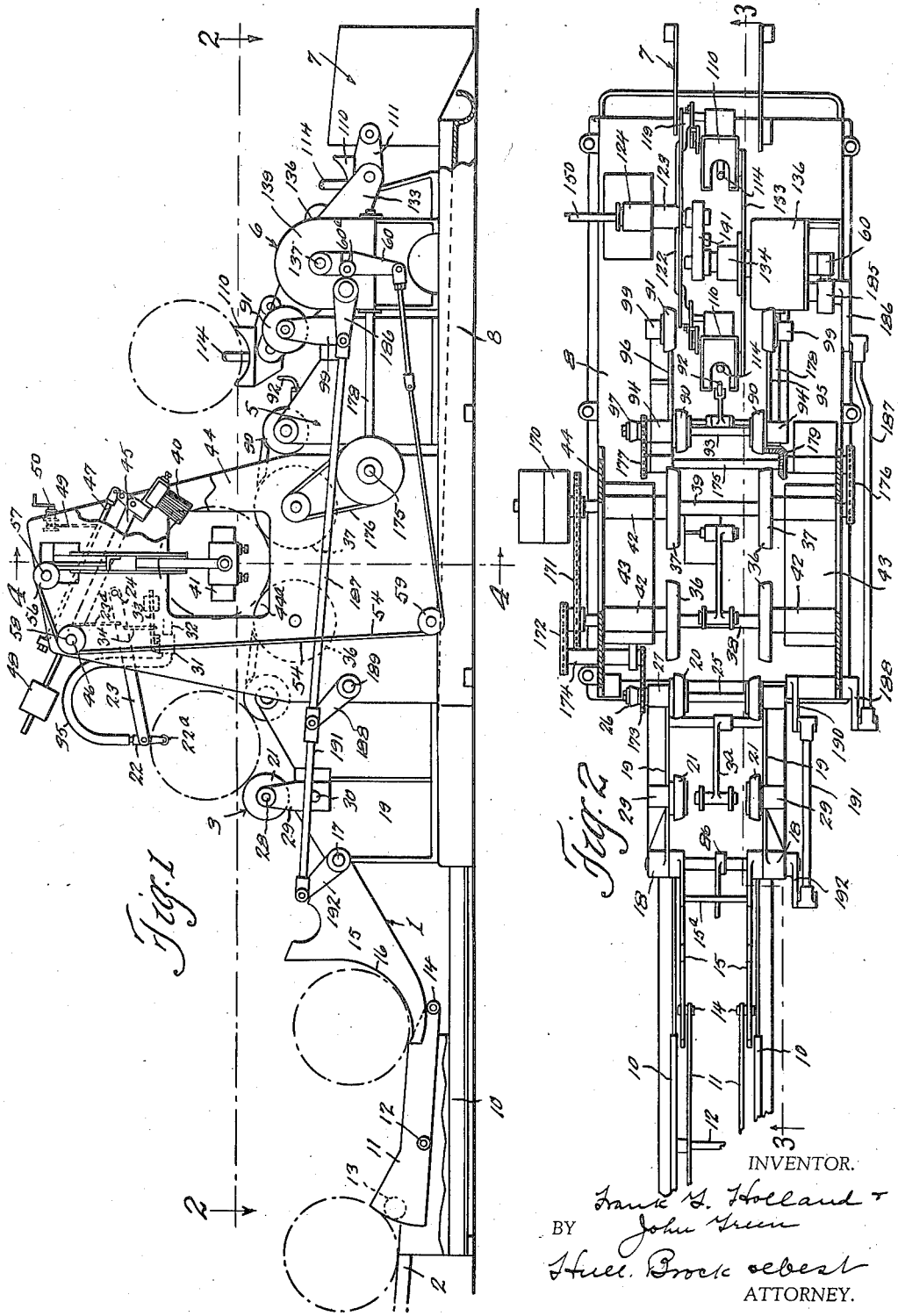
Nov. 3, 1936. F. G. HOLLAND ET AL 2,059,351
BARREL WASHING APPARATUS
Filed Jan. 15, 1934 5 Sheets-Sheet 1
INVENTOR.
Frank G. Holland & John Green
BY
Hull, Brock & Seebert
ATTORNEY.

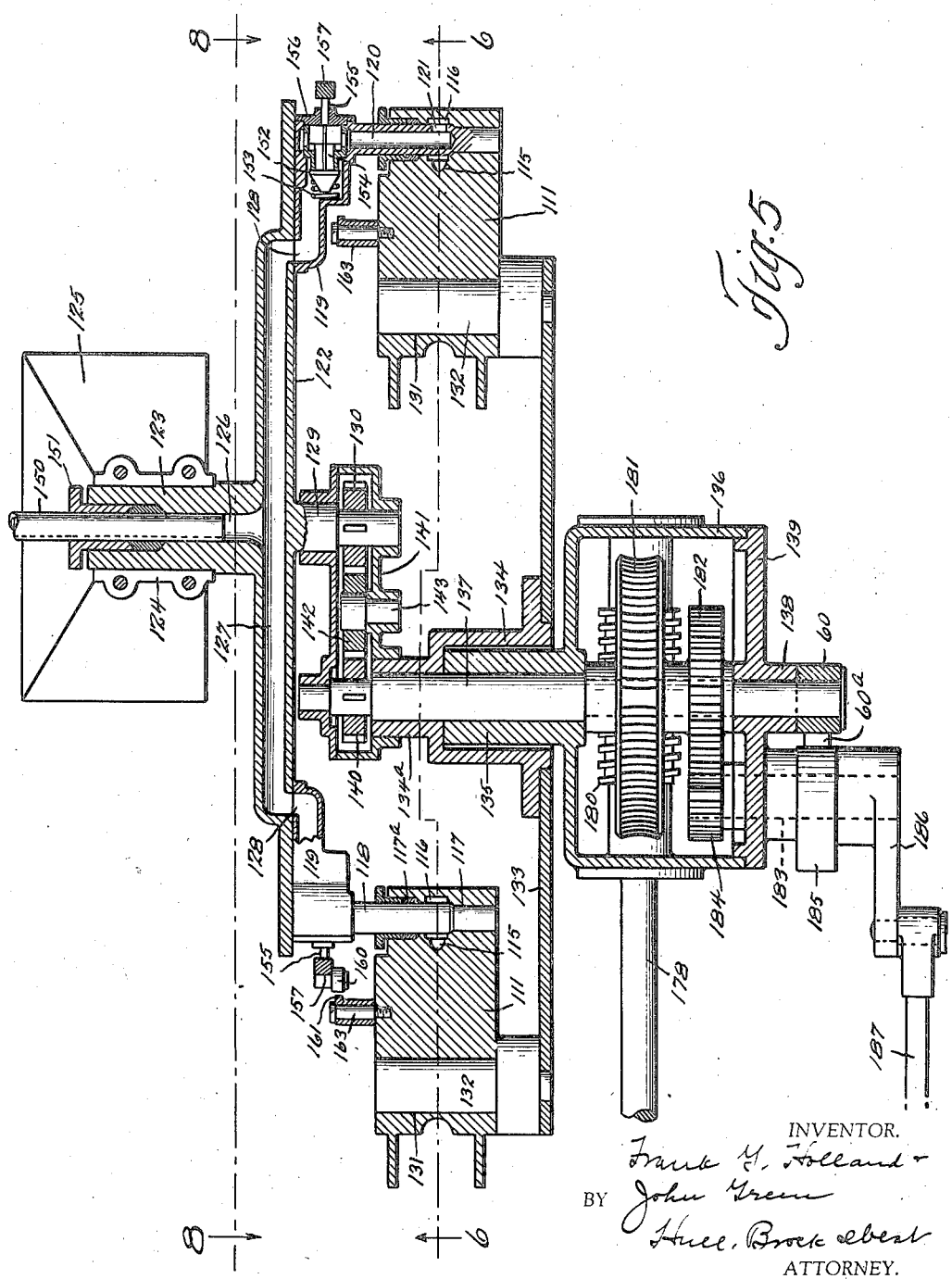

Nov. 3, 1936.   F. G. HOLLAND ET AL   2,059,351
BARREL WASHING APPARATUS
Filed Jan. 15, 1934   5 Sheets-Sheet 4
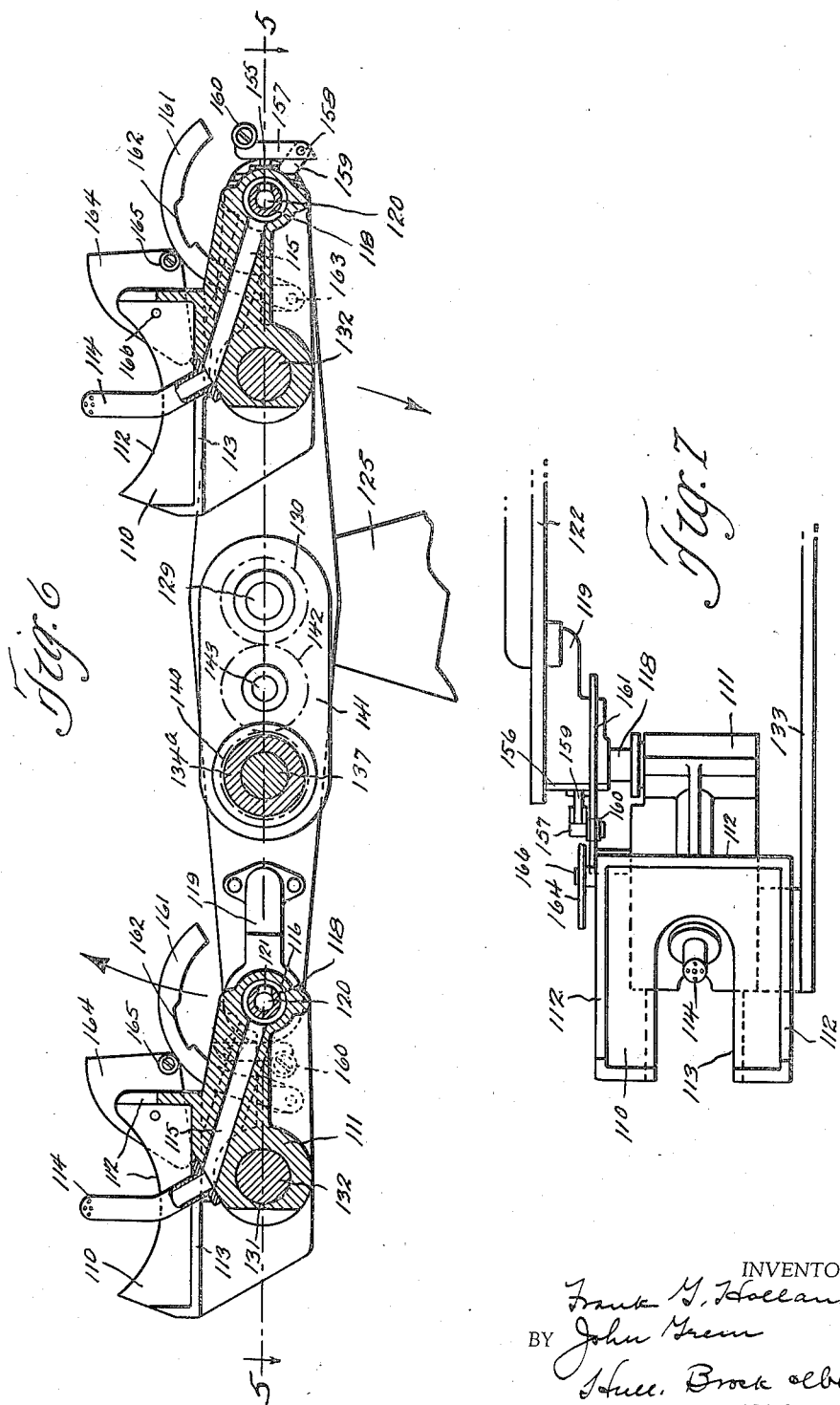
INVENTOR.
Frank G. Holland &
BY John Green
Hull. Brock Albert
ATTORNEY.

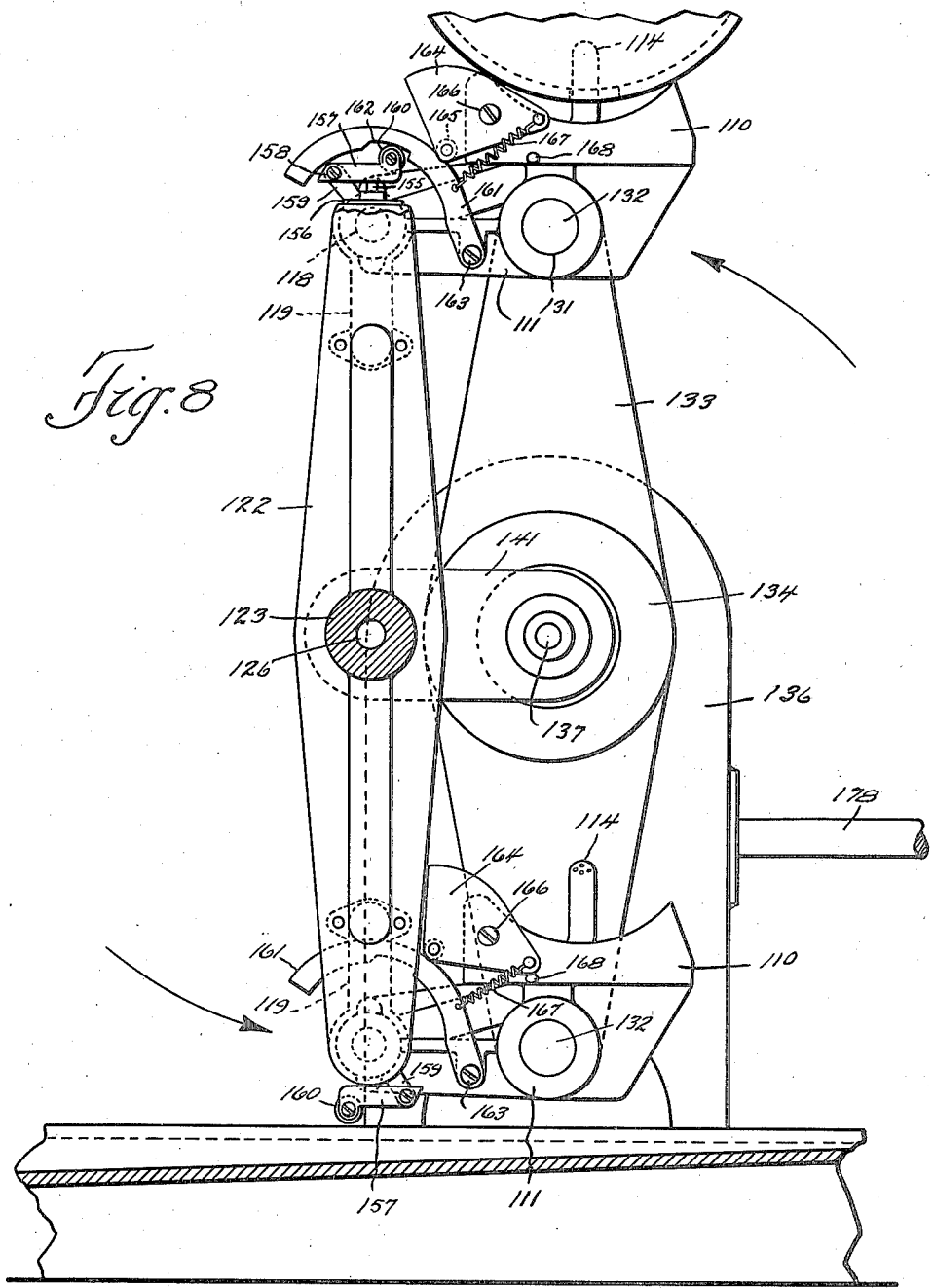

Patented Nov. 3, 1936

2,059,351

UNITED STATES PATENT OFFICE 2,059,351

BARREL WASHING APPARATUS

Frank G. Holland and John Green, Cleveland, Ohio, assignors of one-third to E. F. Buescher Application January 15, 1934, Serial No. 706,611

10 Claims. (Cl. 141—6)

This invention relates to washing apparatus for barrels, kegs and the like and has for an object the provision of an improved construction and arrangement whereby the interior and exterior of this type of container may be thoroughly cleaned.

Another object of the invention is the provision of mechanism for automatically filling a barrel partly full of water before it is delivered to the brushing apparatus in order that a preliminary soaking and rinsing of the interior may take place during the exterior brushing operation.

A further object of the invention is the provision of a single structure in which a number of different steps are provided for cleaning the interior and exterior of barrels and like containers, with the different parts all coacting with each other to successively perform the various cleaning operations and remove the cleaning fluid, so that the barrel or other container may be automatically fed in at one end and discharged at the opposite end, thoroughly cleaned.

Another object of the invention is the provision of a machine of this character, wherein the various parts are so constructed and arranged, that the machine as a whole is very compact and requires but very little floor space for its installation and operation.

A still further object of the invention is the provision of a machine of this character that is very efficient in operation, but is relatively cheap to manufacture and will operate continuously for a long time with practically no maintenance cost.

One embodiment of the invention is illustrated in the accompanying drawings wherein Fig. 1 is a side elevation of a barrel washing apparatus embodying my invention; Fig. 2 is a horizontal sectional view taken on the line 2—2 of Fig. 1; Fig. 3 is a longitudinal sectional view taken on the line 3—3 of Fig. 2; Fig. 4 is a transverse section through the exterior scrubbing mechanism taken on the line 4—4 of Fig. 1; Fig. 5 is an enlarged detail sectional view through the interior spraying, and barrel discharge mechanisms taken on the line 5—5 of Fig. 6; Fig. 6 is a vertical sectional view taken on the line 6—6 of Fig. 5; Fig. 7 is a fragmentary plan view of the parts shown at the left hand side of Figs. 5 and 6, and Fig. 8 is a vertical sectional view taken on the line 8—8 of Fig. 5, the parts having been rotated through 90° from the positions shown in Figs. 5, 6 and 7.

Referring to the drawings by numerals, 1 indicates generally an automatic loading mechanism which receives kegs from an inclined runway 2, and delivers them to a filling station 3, where a predetermined amount of either hot or cold water is put into the keg.

From the filling station, the keg is automatically transferred to a scrubbing mechanism 4, where the exterior of the keg is thoroughly cleaned by rotating it between a set of brushes which engage both the periphery and the ends of the keg, water being sprayed thereon while it is in this mechanism. The rotation of the keg by the scrubbing mechanism agitates the water placed therein at the filling station and thoroughly soaks and rinses the interior of the keg.

From the scrubbing mechanism the keg is transferred to a bung locating mechanism 5 where it is rotated until the bung locater enters the bung hole and holds it (the keg) stationary until it is engaged by a combined interior spraying and discharge mechanism 6, which takes the keg from the bung locating mechanism 5, and deposits it on a discharge runway 7. The keg is held, with the bunghole opening downwardly, in the bung locating mechanism, for a predetermined length of time before being engaged by the discharge mechanism, to allow the water placed therein at the filling station to drain out. While the keg is being transferred from the bung locating mechanism to the discharge runway, the interior thereof is intermittently sprayed with hot or cold water.

The various transfer mechanisms for transferring the kegs from one station or mechanism to another are all timed together and are so constructed and arranged that all the kegs in the machine (after it has become fully loaded) are moved simultaneously from one station, or mechanism to the next.

The scrubbing mechanism 4, bung locating mechanism 5, and combined interior spraying and discharge mechanism 6, are all located on a main base 8, and the filling station 3 is secured to an auxiliary base 9, which is placed adjacent the main base 8. The loading mechanism 1 is also supported from the auxiliary base.

By arranging the various mechanisms in this manner, it is possible to construct a machine either with or without the filling station 3, without changing the construction of any of the individual parts. When the filling station 3 is omitted, the loading mechanism 1 is supported from the main base 8, and delivers kegs from the runway 2, directly to the scrubbing mechanism 4.

The specific construction and operation of the various stations and mechanisms above referred to will now be described.

The lower end of the inclined loading runway 2 joins a framework 10, in which a pair of keg receiving members 11 are pivotally mounted on a transverse shaft 12. Each of the members 11 has a roller 14 on one end, and has its other end connected to a counterweight 13 which extends between said members. A pair of arms 15 are rigidly secured to a shaft 17, and cooperate with the members 11 to receive a keg from the runway 2. These arms are connected together by a tie rod 15ᵃ, and are concave as indicated at 16. As the arms 15 are moved upwardly by the rotation of the shaft 17, to deliver a keg to the filling mechanism 3, the weighted ends of the members 11 drop down to allow a keg to roll onto them, from the runway 2. Then as the arms 15 are moved downwardly to the position shown in Figs. 1 and 3, they come into contact with the rollers 14, depress the rear ends of the members 11, causing a keg to roll into the concave parts 16 of the arms 15, and elevate the forward ends of the members 11, thus preventing another keg from rolling onto them until the arms 15 have been again elevated to deliver the keg, just received, to the filling mechanism.

The shaft 17 is journalled in bearings 18 carried by the side frames 19, of the filling mechanism 3, which in turn are fastened to the auxiliary base 9.

The filling mechanism, generally, comprises the auxiliary base 9, side frames 19, and two pairs of rollers 20 and 21 which support and rotate a keg in operative relation to a bung locating filling nozzle 22 which is attached to one end of an arm 23, pivoted at 24 to one of the side frames of the scrubbing mechanism. The rollers 20 are rigidly secured to a shaft 25, which is rotated through a friction clutch 26, and is journaled in bearings 27 carried by the side frames 19. The rollers 21 are rotatably mounted on stud shafts 28 carried by brackets 29, which are adjustably secured to the side frames 19 as indicated at 30. The adjustable mounting of the brackets 29 permits the accommodation of the machine for various size kegs. The manner of rotating the shaft 25 will be explained hereinafter.

As soon as a keg has been placed on the rollers 20 and 21, by the loading mechanism 1, the bung locating nozzle 22 is lowered by mechanism to be described hereinafter, until the roller 22ᵃ on the lower end thereof comes into contact with the periphery of the keg. The keg is rotated by the rollers 20 and shaft 25, until the nozzle 22 drops into the bung hole, it being understood that the nozzle 22 is positioned in line with the bung hole. A valve 31, in a water line 32, is supported in close proximity to the arm 23, and is opened by a weighted arm 33, which is connected to the arm 23, by a link 34. A flexible hose 35 connects the valve 31 and the nozzle 22. When the nozzle 22 drops into the bung hole, the rotation of the keg is stopped and the valve 31 is opened to allow water to flow into the keg through the flexible hose 35 and nozzle 22. After a predetermined time, the nozzle 22 is withdrawn from the keg and the valve 31 is closed. The keg has then been more or less filled with water, as desired, and is ready to be transferred by the transfer mechanism 3ᵃ to the scrubbing mechanism 4 which is closely adjacent the filling mechanism.

The scrubbing mechanism 4 may be any of numerous well known designs. The one herein illustrated, somewhat diagrammatically, comprises generally two pairs of rollers 36 and 37 rigidly secured on rotatable shafts 38 and 39, respectively, peripheral brushes 40, and end brushes 41. The shafts 38 and 39 are journaled in bearings 42, carried by brackets 43 extending upwardly from the base 8. Side frames 44 are fastened to the base 8 and brackets 43 and extend upwardly therefrom to support the brushing mechanism.

Water is sprayed onto the exterior of a keg, while it is in the scrubbing mechanism, by a sprinkler pipe 64, and a pair of spray nozzles 65.

The peripheral brushes 40 are carried by one end of a lever 45 which is pivotally mounted on a cross shaft 46 extending between the side frames 44 near the upper edge thereof. The angular position of these brushes 40 is adjusted and maintained by a link 47. The brushes drop by gravity onto the kegs, and a counterweight 48 on the other end of the lever 45 is used to regulate the force with which they engage the periphery of the keg. The limit to which the brushes may fall when the brushing mechanism is empty is regulated by a flexible cable 49, one end of which is attached to the brushes and the other end wound onto a drum 50.

The end brushes 41 are adjustably secured to arms 51. A pair of links 52 having their lower outer ends pivotally fastened to the arms 51 and their inner upper ends pivoted to brackets 53 on the upper outside faces of the side frames 44, swingingly support the arms 51 and brushes 41 in such a manner that the brushes are always maintained in a horizontal position. When a keg is in the brushing mechanism, the brushes are allowed to swing by gravity into engagement with the ends of the keg, through opening 44ᵃ in the side frames 44; and when a keg is being delivered to, or transferred from the brushing mechanism, the brushes 41 are swung outwardly by a flexible cable, or chain, 54, which has one end fastened at 55 to the links 52 on the near side of the machine as viewed in Figs. 1 and 2. This cable or chain 54 passes over a pulley 56, rigidly secured to a transverse shaft 57, then over a pulley 58 rigidly secured to the shaft 46 and then over an idling pulley 59 and has its other end attached to an operating lever 60 which is reciprocated at the proper time by mechanism described hereinafter. A pulley 61 is rigidly secured to the opposite end of the shaft 57, and has one end of a short cable or chain 62 connected thereto, the other end thereof being connected to the adjacent links 52 at 63. Thus when the cable 54 is moved, the shaft 57 is rotated and the brushes 41 are swung inwardly or outwardly simultaneously.

A flexible cable 23ᵃ has one end attached to a pulley (not shown) on the shaft 46, and the other end secured to the pivoted arm 23, which carries the bung locating nozzle 22. In this manner, the nozzle 22 is lowered to engage, or is withdrawn from, the bung hole of a keg at the filling station 3.

After a keg has remained in the brushing mechanism a predetermined length of time, the lever 60 is operated to withdraw the brushes 41 outwardly away from the ends of the keg. From the foregoing it will be apparent that the nozzle 22 will be raised at the same time that the brushes 41 are withdrawn.

A transfer mechanism 4ᵃ similar to the transfer mechanism 3ᵃ is then operated to transfer the keg in the scrubbing mechanism to the bung locating mechanism 5.

The transfer mechanism 3ᵃ and loading mechanism 1, are operated simultaneously with transfer mechanism 4ᵃ so that as a keg is transferred from the scrubbing mechanism to the bung locating mechanism, the keg in the filling station will be transferred to the scrubbing mechanism, and a fresh keg will be delivered to the filling station.

The transfer mechanism 3ª is rotatably mounted on a transverse shaft 70, and the transfer mechanism 4ª is rotatably secured to the upper end of a bracket 71, extending upwardly from the base 8.

Each of these transfer mechanisms 3ª and 4ª comprises a swinging arm 72 having a pair of keg engaging rollers 73 mounted on a short shaft carried by the free end of the arm 72; and a depending lever 73ª pivoted at 74 to the arm 72. The levers 73ª can swing freely in a counter-clockwise direction but are prevented from swinging in a clockwise direction by stops 75 on the arms 72. A stop 76 prevents the mechanism 3ª from swinging below the position shown in Fig. 3 and the downward movement of the mechanism 4ª is limited by the engagement of the arm 72 with the bracket 71.

Directly below the mechanism 4ª, a lever 77 carrying a roller 78 on one end is pivoted to a bracket 79 on the base 8; and directly below the mechanism 3ª a similar lever 80 having a roller 81 on one end is pivoted to a bracket 82 on the auxiliary base 9. The lever 77 is connected to the lever 80 by a link 83, and the link 80 is in turn connected, by a link 84, to the lower end 85 of an operating lever 86, that is fastened to the shaft 17. The upper end of the operating lever 86 is forked as indicated at 87 and 88. When the shaft 17 is rotated in a clockwise direction, the levers 77 and 80 are rotated in a counter clockwise direction by the lever 86 and the links 83 and 84, and engage through the rollers 78 and 81 the depending levers 73ª of the transfer mechanisms 3ª and 4ª, to rotate the arms 72 in a clockwise direction. At the same time the fork 87 of the lever 86 will engage the tie rod 15ª and rotate the arms 15 upwardly in a clockwise direction. When the rotation of the shaft 17 is reversed, the levers 77, 80 and 86 will be moved back to the position shown in Fig. 3, allowing the loading mechanism 1 and the transfer mechanisms 3ª and 4ª to return by gravity to the position shown in this figure. The fork 88 is provided to positively start the downward movement of the arms 15, in case they should be moved past dead center on the upward movement.

The bung locating mechanism 5 consists of a pair of driven rollers 90, a pair of idler rollers 91, and a plunger 92 which is spring pressed upwardly into the bung hole of a keg, after it has been rotated into alignment with the plunger 92, by the rollers 90 and 91.

The rollers 90 are fastened to a shaft 93 that is journaled in bearings 94 carried by side frames 95 and 96 secured to the base 8, and is rotated through a friction clutch 97. The rollers 91 are rotatably mounted on stud shafts 98, carried by brackets 99, which are adjustably secured to the side frames 95 and 96. This manner of mounting the rollers 91, together with the adjustable mounting of the rollers 21, permits the machine to be used for washing different size kegs.

The plunger 92 is fastened to a member 100, which is swingingly supported, in such a manner as to always be in a vertical position, by a pair of parallel links 101 which have one of their ends pivoted to the member 100 and their other ends pivotally mounted on transverse supports 102, extending between the frames 95 and 96. A compression spring 103 normally urges the member 100 and plunger 92 upwardly.

When a keg is delivered to the bung locating mechanism 5 from the scrubbing mechanism 4, it is supported on the rollers 90 and 91 and is rotated by the rollers 90 until the bung hole comes into alignment with the plunger 92. The spring 103 then pushes the plunger 92, which until this time has been bearing against the periphery of the keg, into the bunghole and stops the rotation of the keg. The keg remains in this position for the timed interval, which is the same for all the stations and mechanisms, and the balance of the water remaining in the keg which was placed in the keg at the filling station 3, drains out. The keg is then lifted from the rollers 90 and 91, by the combined interior spraying and discharge mechanism 6 and is discharged from the machine onto the discharge runway 7. During the time it is being moved from the bung locating mechanism to the discharge runway, the interior thereof is intermittently sprayed.

The combined discharge and interior spraying mechanism 6 consists generally of a pair of revoluble saddles for supporting a keg, a nozzle carried by each saddle and adapted to enter the bung hole of a keg while it is in the saddle; means for revolving the saddles and means for intermittently admitting water to the nozzles while the saddles are being revolved. The revolving mechanism is so constructed as to always maintain the saddles in an upright position.

The saddles 110 which are formed integrally with body parts 111, have their sides concave, as indicated at 112, and have their front wall and bottom slotted at 113. The concave sides adapt the saddle for use with various size kegs, and the slots 113 permit the saddles to pass the plunger 92 and connected parts. Spray nozzles 114 are secured to each of the body parts 111 and project upwardly through the slots 113. Longitudinal bores 115 connect the interiors of the nozzles with grooves 116 which surround transverse bores 117 in the body parts 111. Shafts 118 project outwardly from valve bodies 119 into the bores 117. The shafts 118 have longitudinal bores 120, and transverse bores 121 which connect the interior of the valve bodies 119 with the grooves 116. Packing glands 117ª prevent any leakage along the shafts 118.

The valve bodies 119 are fastened to opposite ends of an arm 122, which has a short shaft 123 formed integral therewith, midway between the shafts 118 and in parallelism therewith, and projecting outwardly in the opposite direction to the shafts 118. The shaft 123 is journalled in a bearing 124 on a bracket 125 fastened to the base 8; and has a central bore 126 which connects with a passageway 127 which in turn connects with the interior of the valve bodies 119, as indicated at 128. A short shaft 129 projects outwardly from the arm 122 in the opposite direction to the shaft 123 and in alignment therewith, and has a gear 130 keyed thereto.

Each of the body parts 111 has a second bore 131 spaced from and parallel to the bore 117. Stud shafts 132 secured to opposite ends of an arm 133, are mounted in the bores 131. A cup shaped member 134 secured to the arm 133, midway between the shafts 132 and in parallelism therewith, extends outwardly therefrom in the same direction as the shafts 132. The member 134 surrounds a bearing 135, projecting outwardly from a gear box 136, and is secured to a shaft 137 which extends out from the gear box and is journaled in the bearing 135. The other end of the shaft 137 is journaled in a bearing 138 carried by the cover 139 of the gear box. A gear 140, identical with the gear 130 is keyed to one end of the shaft 137. A gear cage 141 which encloses the gears 130 and 140, has one end rotatably mounted on the shaft 129, and the other rotatably mounted on a circular extension 134ᵃ on the cup shaped member 134. An idler gear 142 which meshes with the gears 130 and 140 is rotatably mounted on a stud 143 carried by the gear cage 141 in parallelism with the shafts 129 and 137.

By reference to Figs. 5 and 6, it will be seen that the distance between the center of the shafts 129 and 137 is the same as the distance between the centers of the bores 117 and 131 in each of the parts 111. The various parts just described are so constructed and arranged that when they are in the position shown in Fig. 6, the centers of the shafts 129 and 137 and the centers of the bores 117 and 131, and consequently the shafts 118 and 132, are all in the same horizontal plane.

When the shaft 137 is rotated, the arms 122 and 133 will be rotated in unison—the arm 133 being positively driven through the cup shaped member 134 which is keyed to the shaft 137, and the arm 122 being positively driven from the shaft 137 through the gears 140, 142 and 130 and the shaft 129. The rotation of the arms 122 and 133 will revolve the saddles 110, and always maintain them in an upright position as they are being revolved.

A water supply pipe 150 is inserted into the bore 126 in the shaft 123, and is held therein by a packing gland 151 which prevents leakage of water around the pipe 150.

Water is supplied to the nozzles 114 from the supply pipe 150 through the bore 126, passageway 127, valve bodies 119, bores 120 and 121, grooves 116 and passageways 115.

A valve 152, normally held in closed position by a spring 153, and the pressure of the water, is mounted in each of the valve bodies 119. The valves 152 are secured to slidable spiders 154 which have valve stems 155 secured to the opposite ends thereof, and project out through caps 156. When the valves 152 are in closed position, the supply of water to the nozzles 114 is stopped.

Arms 157 pivoted at 158 to brackets 159 on the caps 156 are positioned over the ends of the valve stems 155, and each has a roller 160 secured to the free end thereof. Arcuate cams 161 each having a notch 162 in its cam face are rotatably mounted on studs 163 carried by the body parts 111, and are positioned in the plane of the rollers 160. Levers 164 each carrying a roller 165 are pivoted to the saddles 110 at 166, and are so positioned that the rollers 165 are held in engagement with the cams 161 by springs 167 each of which has one end secured to a lever 164 and the other end secured to the adjacent cam 161. When a saddle is empty, the lever 164 pivoted thereto is held in engagement with a stop 168 on the saddle 110, as illustrated in Fig. 8.

The saddles 110 are revolved in a clockwise direction, as viewed from the near side of the machine as illustrated in Figs. 1, 2 and 6, and are so positioned that they will operatively engage a keg which is being held stationary on the rollers 90 and 91, by the plunger 92. As the saddle engages a keg, the nozzle 114 will enter the bung hole.

When a keg is received on a saddle 110, it will depress the lever 164 which in turn, through the roller 165, depresses the cam 161. The cam in turn, by its engagement with the roller 160, will depress the lever 157 which will open the valve 152 by forcing the valve stem 155 inwardly, and admit water to the nozzle 114 which sprays it over the interior of the keg. After the saddle has been rotated to the position shown in Fig. 8, the roller 160 will engage the notch 162, which will allow the valve 152 to be closed by the pressure of the water and the spring 153, thus stopping the flow of water to the nozzle 114. Continued movement of the saddles will cause the roller 160 to ride out of the notch 162 and open the valve 152, again admitting water to the nozzle 114. The valve will then stay open until the roller 160 rides off the end of the cam, sometime before the saddle deposits the keg on the discharge runway 7. The cam 161 may have one or more notches of varying lengths, and it will be apparent from the foregoing that the design of the cam 161 determines the manner in which water is admitted to the nozzle 114.

The saddles 110 are rotated continuously, first one saddle and then the other receiving a keg from the bung locating mechanism. The machine as shown is so arranged and timed that a keg will stay in each of the various mechanisms, the length of time it takes to rotate the saddles through 180°.

The driving mechanism for the various parts will now be described.

Power is supplied to the machine by rotating the shaft 39 through a pulley 170 on one end thereof. The shaft 38 and rollers 36 are rotated from the shaft 39, through a chain and sprocket connection indicated at 171; and the shaft 25 and rollers 20, are rotated through the friction clutch 26, chain and sprocket connections 172 and 173 and idler shaft 174. An idler shaft 175 is rotated from the shaft 39 through a chain and sprocket connection 176. The shaft 93 is driven through the friction clutch 97 and a chain and sprocket connection 177. A shaft 178, extending into the gear box 136 is driven from the idler shaft 175 through bevel gears 179. A worm 180 is secured to the shaft 178, within the gear box 136, and meshes with a gear 181 keyed to the shaft 137. A spur 182, keyed to the shaft 137, adjacent the gear 181, drives a shaft 183 through a gear 184 keyed thereto. The shaft 183 has a cam 185 and a crank 186 fastened thereon. The operating lever 60 is oscillated by the cam 185 engaging a roller 60ᵃ on the lever 60. This in turn operates the filling nozzle 22, and brushes 41 at the proper time, as hereinbefore described. The shaft 17, and from it the loading mechanism 1 and the transfer mechanisms 3ᵃ and 4ᵃ, is rocked by the crank arm 186, through link 187, lever 188, offset shaft 189, lever 190, link 191 and lever 192 on the shaft 17.

It will be seen from the foregoing that we have devised a machine of the character described which will perform the objects of the invention in a simple and efficient manner.

Having thus described our invention, what we claim is:—

1. In a keg washing apparatus of the character described, means for simultaneously spraying the interior of a keg and discharging it from the apparatus, said means comprising a pair of saddles each for supporting a keg, a pair of opposed arms spaced from each other, the ends of one of said arms being pivotally connected to the rear ends of the saddles on one side thereof, and the ends of the other arm being pivotally connected to the forward ends of the saddles on the other side thereof, a shaft for rotatably supporting said one of said arms, and a shaft for rotatably supporting said other arm, the said shafts being mounted out of alignment with each other, means for driving said second mentioned shaft, gearing connecting said shafts for driving the first mentioned shaft from the second mentioned shaft, a pair of spray nozzles, one on each saddle, means for supplying liquid to said nozzles, a pair of valves secured to said one of said arms, one on each end thereof for controlling the supply of liquid to said nozzles, and means carried by said saddles for operating said valves.

2. In a device of the character described, a carrier provided with a saddle for supporting a keg, means for rotating said carrier about a substantially horizontal axis and for maintaining said saddle in keg supporting position during the rotation thereof, a single nozzle on said saddle, a valve for controlling the supply of fluid to said nozzle and means for automatically opening and closing said valve a plurality of times while a keg is on the saddle for intermittently spraying the interior of a keg through said nozzle a plurality of times, while it is on said saddle.

3. In a device of the character described, a carrier provided with a saddle for supporting a keg, means for rotating said carrier about a substantially horizontal axis and for maintaining said saddle in keg supporting position during the rotation thereof, a nozzle adapted to spray the interior of a keg on said saddle, and mechanism for intermittently supplying fluid to said nozzle while a keg is on said saddle whereby the interior of a keg is alternately sprayed and drained a plurality of times, the said mechanism being operated by the rotation of the carrier.

4. In a device of the character described, a rotatable carrier provided with a saddle for supporting a keg, means for rotating the carrier and for maintaining the saddle in a keg supporting position during the rotation of the carrier, a nozzle on the carrier and mechanism for intermittently supplying fluid to the nozzle including a valve and valve operating means for automatically alternately opening and closing said valve a plurality of times while a keg is on said saddle, and means operated by a keg when on said saddle for moving said valve operating means from inoperative position to operative position.

5. In a device of the character described, a carrier provided with a saddle for supporting a keg, means for rotating said carrier about a substantially horizontal axis and for maintaining said saddle in keg supporting position during the rotation thereof, a nozzle on said saddle adapted to enter the bung hole of a keg on said saddle, and mechanism for intermittently supplying fluid to said nozzle, the said mechanism including a valve and a cam operated by the rotation of said carrier for alternately opening and closing said valve.

6. In a device of the character described, a carrier provided with a plurality of saddles each for supporting a keg, means for rotating said carrier about a substantially horizontal axis and for maintaining said saddles in keg supporting position during the rotation thereof and mechanism including a single nozzle on each saddle, a valve for each nozzle for controlling the supply of fluid thereto and automatic means associated with each valve for automatically alternately opening and closing the associated valve a plurality of times during the movement of the carrier, while a keg is on the associated saddle.

7. In a device of the character described, a carrier provided with a plurality of saddles each for supporting a keg, means for rotating said carrier about a substantially horizontal axis and for maintaining said saddles in keg supporting position during the rotation thereof and mechanism including a single nozzle on each saddle for intermittently spraying the interior of a keg through said nozzle a plurality of times while it is on a saddle, the said mechanism being operated by the rotation of the carrier.

8. A combined interior spraying and discharge mechanism for keg washers, comprising a saddle, means for moving said saddle in a curved path in a vertical plane and for maintaining said saddle in keg supporting position during said movement, a nozzle on said saddle adapted to enter the bung hole of a keg on said saddle, a supply line for supplying fluid to said nozzle, a valve in said line and automatic means for alternately opening and closing said valve a plurality of times while the keg is on said saddle whereby fluid is intermittently supplied to said nozzle.

9. A combined interior spraying and discharge mechanism for keg washers, comprising a saddle, means for moving said saddle in a curved path in a vertical plane and for maintaining said saddle in keg supporting position during said movement, said means comprising a pair of arms pivotally connected to said saddle at spaced points and being pivotally connected to supports which are positioned axially out of alignment with each other, a nozzle on said saddle adapted to enter the bung hole of a keg on said saddle, a supply line for supplying fluid to said nozzle, a valve in said line and means for automatically alternately opening and closing said valve a plurality of times while the keg is on said saddle whereby fluid is intermittently supplied to said nozzle.

10. In a keg washing apparatus of the character described, means for simultaneously spraying the interior of a keg and discharging it from the apparatus, said means comprising a pair of saddles each for supporting a keg, a pair of opposed arms spaced from each other, the ends of one of said arms being pivotally connected to the rear ends of the saddles on one side thereof, and the ends of the other arm being pivotally connected to the forward ends of the saddles on the other side thereof, a shaft for rotatably supporting said one of said arms, and a shaft for rotatably supporting said other arm, the said shafts being mounted out of alignment with each other, means for driving said second mentioned shaft, gearing connecting said shafts for driving the first mentioned shaft from the second mentioned shaft, a pair of spray nozzles, one on each saddle, means for supplying water to said nozzles, a pair of valves secured to said one of said arms, one on each end thereof for controlling the supply of liquid to said nozzles, and means including a cam and lever carried by said saddles for operating said valves, said lever engaging said cam and being adapted to be engaged by a keg on a saddle and said cam being adapted to engage and operate the valve.

FRANK G. HOLLAND.
JOHN GREEN.